United States Patent [19]
Kim et al.

[11] Patent Number: 5,503,957
[45] Date of Patent: Apr. 2, 1996

[54] ORGANIC OPTICAL RECORDING MEDIUM AND METHOD FOR THE PREVENTION OF REWRITE THEREIN

[75] Inventors: Jung H. Kim; Young J. Heo, both of Seoul; Tae Y. Nam, Suwan, all of Rep. of Korea

[73] Assignee: Cheil Synthetics Inc., Kyoungsangbuk-do, Rep. of Korea

[21] Appl. No.: 363,100

[22] Filed: Dec. 22, 1994

[30] Foreign Application Priority Data

Feb. 28, 1994 [KR] Rep. of Korea .................. 94-3804

[51] Int. Cl.$^6$ .................. G11B 7/24; G11B 7/00
[52] U.S. Cl. .................. 430/270.21; 430/271.1; 430/945; 430/328; 430/330; 369/284; 428/64.4
[58] Field of Search .................. 430/270, 495, 430/945, 271, 273, 328, 330; 369/284, 287; 428/64, 64.4

[56] References Cited

U.S. PATENT DOCUMENTS

| | | | |
|---|---|---|---|
| 5,090,009 | 2/1992 | Hamada et al. | 369/284 |
| 5,155,723 | 10/1992 | Hamada et al. | 369/284 |
| 5,168,031 | 12/1992 | Buckingham et al. | 430/270 |
| 5,354,590 | 10/1994 | Tamura et al. | 428/64 |

Primary Examiner—Charles L. Bowers, Jr.
Assistant Examiner—John A. McPherson
Attorney, Agent, or Firm—Saliwanchik & Saliwanchik

[57] ABSTRACT

There is provided a WORM type organic optical recording medium comprising a recording layer, a reflective layer and a protective layer which are formed in sequence on a substrate, the recording layer consisting of near infrared absorbing dye able to absorb a laser beam and to generate heat and provided with a curing layer of thermosetting or photocuring resin thereon or thereunder. There is also provided a method for the prevention of rewrite in the organic optical recording medium, comprising subjecting the organic optical recording medium to heating up to 50° C. or exposure to a UV light, to cure the curing layer. The organic optical recording medium requires reduced amounts of the dye and, thus, has improved reflectivity. By virtue of this improvement in reflectivity, a low-price metal may be employed in the reflective layer, bringing about additional economic benefit, along with lower requirements for dye. Inscription of recording signals in the resin of the curing layer by the dye eliminates the anxiety that recording information may be damaged by spontaneous discoloration of the dye. Crosslinking the curing layer results in improved durability as well as prevention of rewrite. Consequently, this medium has long data archival capabilities and is useful as a medium for recording a variety of information or pictures.

7 Claims, 2 Drawing Sheets

ORGANIC OPTICAL RECORDING MEDIUM AND METHOD FOR THE PREVENTION OF REWRITE THEREIN

BACKGROUND OF THE INVENTION

1. Field of the Invention

The present invention relates, in general, to an organic optical data storage medium which is recordable and readable by using a light source of laser and, more particularly, to an organic optical recording medium with high data storage density, high data rates and long data archival capabilities, useful as a medium for recording a variety of information or pictures.

2. Description of the Prior Art

A variety of information is explosively increased in an information-intensive society. Such information explosion requires recording media to have increased data storage density and data rate and to be more rapid in operation.

Currently, the practical or commercial techniques for recording data are based substantially on magnetic recording technology. In general, the data are stored on magnetic media, such as video tapes, audio tapes, floppy disks and the like, on which information is recorded depending on the direction of magnetization of magnetic substances in the magnetic recording medium.

While the magnetic recording technology is commercially successful and advantageous, a recording technique known generically as optical recordings has been and continues to be considered a very promising alternative for data storage, as a recording medium with higher capacity is demanded according to the enormous amount of information resulting from the development of society.

A magneto-optical recording medium comprises a recording layer magnetizable in a plane perpendicular to the plane of the layer itself, in contrast with magnetic media. In addition, the coercive force of a magneto-optical recording medium, which is the ability to remain in the magnetized state, is about 5 to 10 times as high as that of a magnetic medium. Accordingly, it is very difficult to change the previous direction of magnetization with an external magnetic field.

The recording of information on a magneto-optical recording layer is effected by first focusing a modulated laser beam on a surface of the layer within 1 μm in diameter, the laser beam power being sufficient to heat the layer locally, for example, to the Curie temperature point of the layer. In this state, the direction of magnetization can be changed with an external magnetic field, so as to record information on the layer according to the direction of magnetization.

When the information is recorded by this method, the recorded unit of information comes to be reduced into 1 μm or less. Accordingly, the recording density of magneto-optical recording medium is 10 to 1,000 times greater than that of conventional magnetic recording medium. In addition, the magneto-optical medium employs a non-contact recording method, so that magneto-optical recording potentially has significant advantages over magnetic recording, including easier data preservation and longer data archival capability.

However, there are many disadvantages in producing the magneto-optical recording medium used in such method. For example, heavy metals are used as magnetic substances and a very expensive vacuum deposition or sputtering apparatus is required.

Many attempts have been made to solve such disadvantages. One of the attempts is to develop an organic optical recording material. The organic optical recording material may be grouped into a Write Once Read Many (hereinafter, referred to as "WORM") type and a rewritable type on the basis of the erasability of the material. On the WORM type material, only readout of information is possible after recording data once, whereas, on the rewritable type material, erasure of the data is also possible after recording.

WORM type medium is manufactured, as disclosed in Japanese Patent Laid-Open Publication Nos. Sho. 57-46362, 58-197088, 59-5096 and 63-179792, by coating light-absorbing dye admixed with polymer on a reflective layer to form a recording layer and overcoating a protective layer on the recording layer. To write a data bit in this optical recording system, a laser beam is focused on a very small spot of the recording layer, for example, within 1 μm in diameter. As a result, the light-absorbing dye generates heat, which decomposes the polymer to form a pit. Reading of the recorded information (logic 1 or 0) is effected by using the difference between the reflectivity of the medium in the presence and absence of the pit. Since WORM type material has a recorded portion which is in a state of polymer decomposition, it is impossible to record data on the polymer-decomposed portion after erasing the information.

Rewritable type material has been vigorously researched and the research has been directed to formation and erasure of bumps or pits or to use of liquid crystals or phase changes (Japanese Patent Laid-Open Publication Nos. Sho. 58-199345, 63-74135, 3-256241, 3-256242 and 3-266235). Of these, a method of utilizing bumps is extensively applied. In the method of utilizing bumps, recording is accomplished by thermally expanding a dye-dispersed organic polymer by a recording laser, to produce bumps and maintaining their shapes.

Technologies for such rewritable type materials employing the organic dye are described in many patents including U.S. Pat. Nos. 4,712,625, 4,780,867, 4,825,430 and 4,896,314, all being assigned to Optical Data Inc., USA. The rewritable type optical recording medium consists typically of three layers: a substrate, a recording layer and an erasing layer. While the recording layer comprises an elastic polymer resin and dye capable of absorbing a recording laser, the erasing layer comprises a thermoplastic polymer resin and dye capable of absorbing an erasing laser.

Reading of recorded information in the rewritable type optical recording medium is effected by using the difference between the reflectivity of unrecorded portions and bumps upon irradiating with a recording laser with a weak to medium power. However, the rewritable type optical recording medium possesses the characteristics of low reflectivity. To improve the reflectivity of the dye itself dispersed in the recording layer, there have been many attempts (Japanese Patent Laid-Open Publication Nos. Sho. 58-112790, 62-146682 and Hei. 1-206093). It has been proven that there is, however, a limitation in improving the reflectivity of the dye itself.

For erasure of data in the rewritable type optical recording medium, an erasing laser is initially focused on the erasing layer with a power sufficient to heat the erasing layer to not less than its glass transition temperature. As a result, the erasing layer is weakened in resistance to retention force of the recording layer, so that the recorded portion is restored to its original state by the retention force. In this regard, reliability should be taken into account for bump formation, in order to show appropriate information carrier to noise (C/N) ratios when using the medium repetitively. An improvement in the reliability was made in Japanese Patent Laid-Open Publication No. Sho. 63-207691, but it is believed that the patent has limited practical application to optical recording medium.

Currently, WORM type optical recording media are of disk shape in practice and have been intensively advanced in the fields including data storage disk, recordable CD-Audio and Photo CD. Related techniques are disclosed in Japanese Patent Laid-Open Publication Nos. Hei. 2-67183, 4-76836 and 4-102242, all assigned to Fuji Photo Film Co. Ltd., Japan; Japanese Patent Laid-Open Publication Nos. Hei. 2-24437, 2-273339, 2-312020, 3-66042, 3-203694, 3-224792, 4-25493 and 4-28588, all assigned to TDK Corp., Japan; Japanese Patent Laid-Open Publication Nos. Hei. 3-203690, 3-203691, 3-203692 and 3-203693, all assigned to Pioneer Electric Corp., Japan; Japanese Patent Laid-Open Publication Nos. Hei. 2-132649, 2-132654, 21-32656, 2-132657, 2-206093 and 2-84384 and U.S. Pat. No. 5,090,009, all assigned to Taiyo Yuden Corp., Japan; and Japanese Patent Laid-Open Publication Nos. Hei. 3-46135 and 4-70380, all assigned to Sony Corp.

CD-ROMs described in the just mentioned patents are recordable and characterized by readability in conventional CDP or CD-ROM drives. Their recording layer consists only of dye, which does not improve reflectivity of the disk and causes increases in production costs. A WORM type organic optical recording medium having a recording layer consisting of a dye-dispersed thermoplastic resin is also mentioned in the above-noted patents. Nowhere is there described CD compatibility of the WORM type organic optical recording medium, whereas there are examples of applying it to a disk. If it is applied for CD-compatible disks, there might be difficulty in selecting solvents for coating or in controlling the thickness of the recording layer. Nevertheless, effects such as low cost and improvement in reflectivity are expected to be brought about due to reduction in the amount of dye.

Commercially available, existing CD-ROMs, which have a recording layer consisting only of a dye layer, are recordable and readable in a drive for CDs but have a characteristic that data recorded once are not erasable because it is of WORM type, which is impossible to erase. To provide erasability, CD-compatible inorganic type disks have been researched but are very expensive. In addition, there is a risk of data loss by oxidation. Owing to these reasons, such CDs are not generally available.

In the case that commercially available CD-ROMs, on which data are recorded by a CD-ROM exclusive recorder and which have unrecorded portions after recording, are loaded on the recording apparatus, undesired data may be appended in the unrecorded and thus recordable portions by, for example, operator error or intentional operation. In spite of the security problems, such as data manipulation, annexation and so on, there are no readily available protective means that prevent rewrite of data. In addition, where the CD-ROM is repetitively read many times, there is a risk that data might be damaged by the recording laser.

In general, recording media using organic optical recording substances have an unavoidable, fatal drawback in durability. This drawback has been considerably minimized by virtue of technique development. However, in case of CD-ROMs using dye alone, the dye is spontaneously discolored, which results in the loss of data.

BRIEF SUMMARY OF THE INVENTION

For solving the problems encountered in the prior art, the present inventors have recognized that there exists a need for the improvement in protection against data loss and data rewrite and in archival capability. In accordance with an aspect of the present invention, there is provided a WORM type organic optical recording medium comprising a recording layer, a reflective layer and a protective layer which are formed in sequence on a substrate, the recording layer consisting of near infrared absorbing dye capable of absorbing a laser beam to generate heat and of a thermosetting or photocuring resin.

In accordance with another aspect of the present invention, there is provided a method for the prevention of rewrite in a WORM type organic optical recording medium comprising a substrate, a curing layer, a recording layer, a reflective layer and a protective layer, comprising curing the curing layer by heating up to 50° C. or irradiating with UV light, said recording layer consisting of dye able to absorb near-infrared rays and thus generating heat and having said curing layer consisting of a thermosetting or photocuring resin thereon or thereunder. In the present invention, the near infrared absorbing dye is selected from the group consisting of cyanines, quinones, pthalocyanines and chroconiums. The cyanine dye is preferable represented by the following formula I:

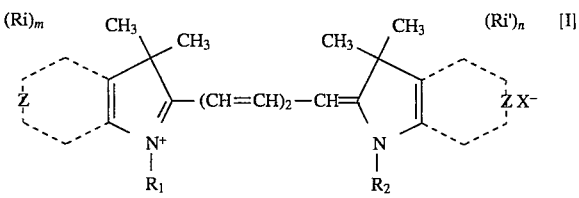

wherein Z is a group to form a benzene ring or naphthalene ring;

$R_1$ and $R_2$ are each selected independently from the group consisting of alkyl, alkoxy, hydroxy, carbonyl, allyl and alkyl halide;

Ri and Ri' may be the same with or different from each other and each is a substituent selected from the group consisting of a hydrogen atom, a halogen atom, an alkyl group containing 2 to 5 carbon atoms and an alkoxy group containing 2 to 5 carbon atoms;

m and n are integers of 1 to 4, representing the number of substituent(s); and $X^-$ is an anion of halogen atom, perchloric acid, alkyl sulfonic acid, or toluene sulfonic acid.

BRIEF DESCRIPTION OF THE DRAWINGS

The above object and other advantages of the present invention will become more apparent by describing in detail the preferred embodiments of the present invention with reference to the attached drawings in which.

DETAILED DISCLOSURE OF THE INVENTION

The applications of the preferred embodiments of the present invention are best understood with reference to the accompanying drawings.

Figure 1:
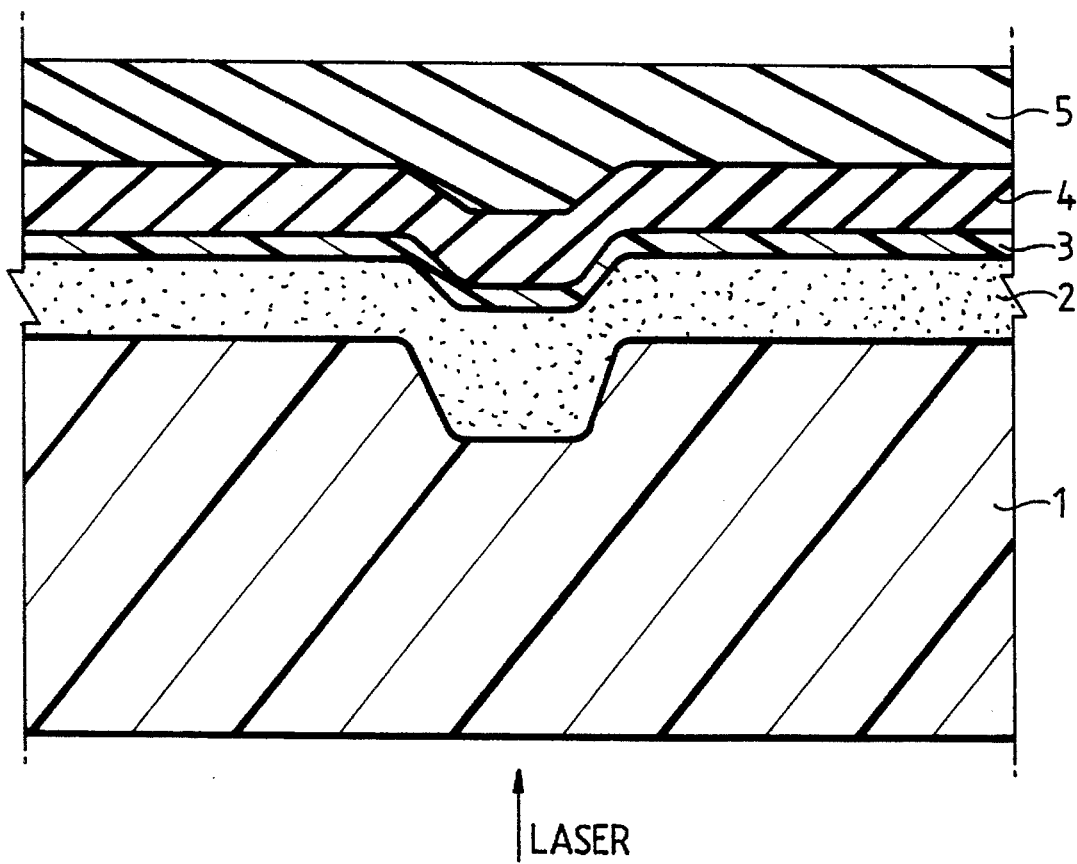
FIG. 1 is a schematic fragmentary cross-sectional view of an organic optical recording medium for disk, according to the present invention.

Referring initially to FIG. 1, there is shown an organic optical recording medium applied for disk, according to an embodiment of the present invention. As shown in this figure, the organic optical recording medium is structured to have a substrate 1 having grooves on which a curing layer 1, a recording layer 3, a reflective layer 4 and a protective layer 5 are formed in sequence.

Polycarbonate or amorphous polyolefin may be used as the substrate 1.

The curing layer 2 is formed of a setting resin which is crosslinked by heating or exposure to light. Preferably, the setting resin used in the present invention has its physical properties easily transformed by heating before curing but transformed. little by heating after curing owing to high thermal deformation and decomposition temperatures.

The recording layer 3 consists only of dye. The function of the dye dispersed in the curing resin is to absorb a recording laser and to generate heat. To effect this function, it is required that the dye have large absorption coefficient and high thermal stability. Accordingly, the dye used in the present invention is preferably of near infrared absorbing cyanine type.

For the substance of the reflective layer 4, current CD-ROMs adopt gold, which is good in reflectivity at 780 nm, to compensate for the reduction of reflectivity caused by dye over the recording layer. However, it is undesirable to use gold, which is very expensive. In contrast, it is possible to adopt a general, low-priced metal, such as aluminum, in the organic optical recording medium according to the present invention. The reason is that, since the dye is dispersed in the recording layer 3 in limited amounts, the reflectivity is increased.

In order to prevent damage and delamination of the recording layer, the protective layer 5 is formed of a UV-curing resin with some hardness.

With regard to preparation procedures for the organic optical recording medium for disk, a setting resin, which is capable of being crosslinked by heat or light and which is selected from the group consisting of epoxy resins, acrylic resins, urethane resins and silicon resins, is first coated in a thickness of approximately 0.1 to approximately 0.5 µm on a polycarbonate or amorphous polyolefin substrate 1 having pregrooves therein, so as to form a curing layer 2, as shown in FIG. 1. A solution wherein near infrared absorbing dye is dissolved in a solvent, such as methylcellosolve and diacetone alcohol, is coated on the curing layer 2 at a velocity of 1,000 to 3,000 rpm, to form a recording layer 3 with a thickness of approximately 0.1 to approximately 2 µm. On the recording layer 3 is sputtered a metal, such as Au, Au-Pb alloy or Al, to form a 1,000 Å reflective layer 4. For completion of the disk, a UV-curing resin is overcoated on the reflective layer 4 in a thickness of approximately 10 to approximately 20 µm, to form a protective layer 5.

Figure 2:
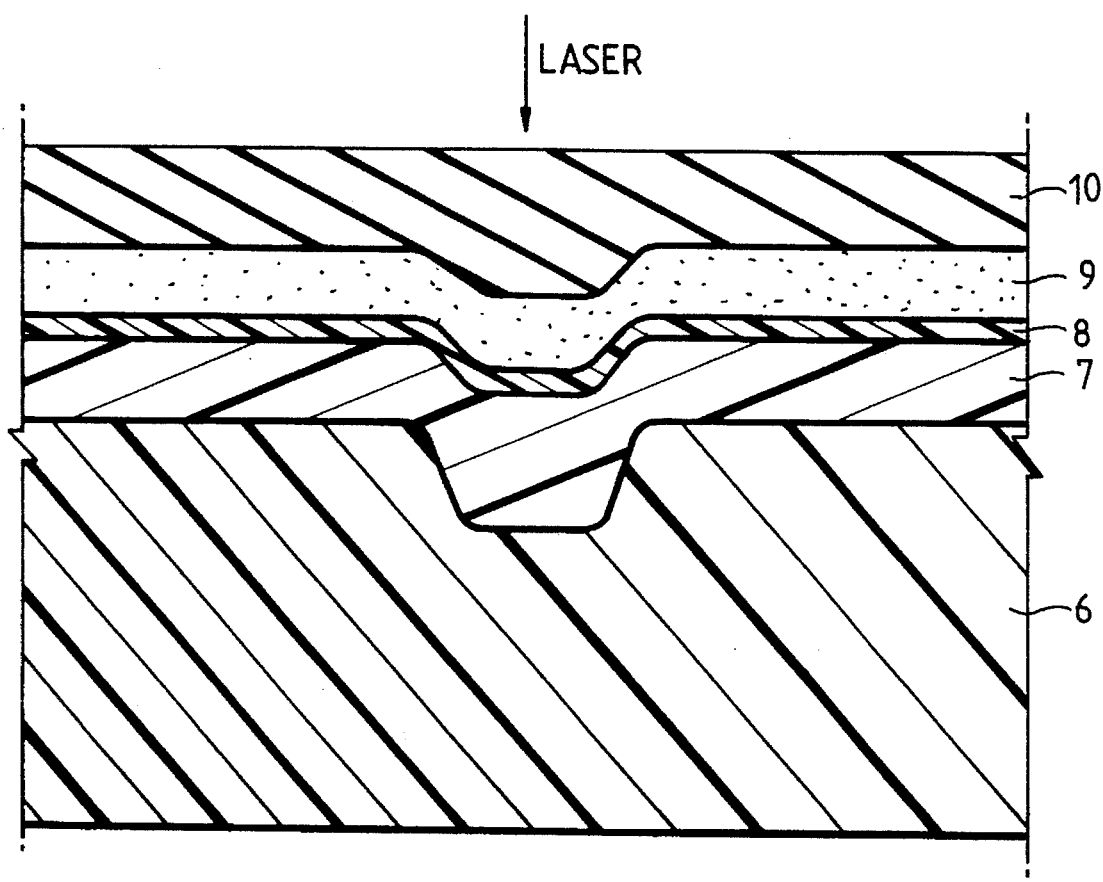
FIG. 2 is a schematic fragmentary cross-sectional view of an organic optical recording medium for tape, according to the present invention.

The optical recording medium according to the present invention can be applied to tape. In this case, as shown in FIG. 2, aluminum is initially deposited over a 30 µm polyethyleneterephthalate film substrate 6 in a thickness of approximately 0.05 µm, to form a reflective layer 7 over which a recording layer 8 consisting of above-mentioned near infrared absorbing dye is formed in a thickness of approximately 0.1 to approximately 0.5 µm. A curing resin is coated on the recording layer 8 in a thickness of approximately 0.1 to approximately 0.5 µm, to form a curing layer 9, followed by overcoat of silicon type hard resin on the curing layer, to form a protective layer 10 approximately 0.1 to approximately 0.3 µm thick.

In preparing such organic optical recording media, it is required that the recording layer have a thickness of approximately 0.1 to approximately 0.5 µm, as mentioned above, in order to record information and to read data. For example, if the recording layer is too thin, too little heat is generated to effect thermal deformation owing to the small amount of light absorption. On the other hand, if it is too thick, the reflectivity is lowered below 70% so that recorded data is not read.

For writing data in the recording layer, a laser beam is focused on an area of the recording layer with the dye absorbing the laser and generating heat. This heat makes the local area of the recording layer 3 deform, so that a pit is formed to generate a recording signal. For reading the data recorded, there is used a recording laser which has a lower power than that used when recording data. Upon irradiating the recording laser on a surface of the disk, information is readout by difference of the reflectivity between unrecorded portions and the pit.

In addition to the recording, which is effected by deforming the recording layer and the curing layer with the heat absorbed by the dye, the present invention is also characterized by crosslinking the resin of the curing layer in order to prevent rewrite after the recording. For this, the curing layer is exposed to a UV beam or heated to not less than 50° C. after the writing, so as to cure the curing layer, thereby removing recording capacitance of the recording layer. That is to say, the physical properties of the curing layer are so transformed by the light or heat as to not readily generate change in unrecorded portions even with a recording laser of high power, and thus, the recording property of the medium is removed. As a result, rewrite attributed to operator error or intentional rewrite can be prevented in the organic optical recording medium, according to the present invention.

In commercially available, existing CD-ROMs, recording signals are inscribed by deforming, for example, a polycarbonate substrate with heat generated from the dye. The amount of heat is substantially dependent on the dye used. Accordingly, the dye should be used in a large enough amount to generate heat which exceeds the thermal resistance of the substrate, in order to record information. However, if the dye layer is made thick to cause corresponding deformation of the substrate, the CD-ROMs come to have low transmissivity of the recording layer and suffer from low reflectivity.

By contrast, in the organic optical recording medium according to the present invention, the curing layer is comprised of low molecular weight, unreacted curing resin, so that it could be cured with small amounts of heat generated by the dye. In other words, writing of data can be accomplished with small amounts of the dye. Correspondingly, the recording layer can be reduced in thickness, which results in an improvement in reflectivity and in reduction in production costs, in accordance with the present invention.

As emphasized above, the amount of the dye in the present organic optical recording medium is less than that in conventional CD-ROMs and thus, the organic optical recording medium of the present invention has improved reflectivity compared to conventional CD-ROMs. By virtue of this improvement in reflectivity, a low-price metal, e.g., aluminum, instead of gold (Au), may be employed in the reflective layer. This brings about economical benefit, along with decreased requirements for dye.

Since commercially available CD-ROMs have a recording layer consisting only of dye, there is anxiety about data damage by reading lasers upon repetitive readout and data loss by spontaneous discoloration of the dye. In contrast, in the disk according to the present invention, since recording signals are inscribed in the resin of the curing layer by the dye, there is no damage to recording information even if the dye is spontaneously discolored. Moreover, the curing layer of the present invention is crosslinked by a proper process so that it serves as a recording layer. Hence, there are advantages of improved durability and rewrite prevention.

The preferred embodiments of the present invention will now be further described with reference to specific examples.

Following are examples which illustrate procedures, including the best mode, for practicing the invention. These examples should not be construed as limiting. All percentages are by weight and all solvent mixture proportions are by volume unless otherwise noted.

EXAMPLES 1 THROUGH 3

An epoxy resin (trademark: EOCN 1020, commercially available from Nippon Kayaku Co., Ltd., Japan), a curing agent (trademark: PSM 4261, commercially available from Nippon Kayaku Co., Ltd., Japan) and a catalyst TPP were mixed at composition ratios given in the following Table 1. This mixture was coated in a thickness of 0.5 μm over an amorphous polyolefin 1 (trademark: Zeonex 280, commercially available from Nippon Zeon Co., Ltd., Japan) having pregrooves, to form a curing layer 2. Over the curing layer 2 was coated dye (commercially available from Nippon Kanko Shikiso Kenkyusho K.K., Japan), to form a recording layer 3 with a thickness of 0.15 μm. For a reflective layer 4, Au was deposited in a thickness of 1000 Å. SD-17 (trademark, commercially available from Dainippon Ink & Chemicals Co., Ltd., Japan) was used for a protective layer 5.

The organic optical recording media thus obtained were recorded using an audio CD recorder (trademark: RPD-1000, commercially available from Pioneer Electric Corp., Japan) and then, subjected to thermal treatment at 70° C. for 30 minutes, to cure the recording layer for the purpose of preventing rewrite. Read characteristics of the recorded media were evaluated by CD-CAT (trademark, commercially available from Studer Revox A.G.).

The media were tested for light stability by exposing to a light 15 cm distant from a light source of xenon lamp with a power of 1.5 kw, for 20 hours and detecting the change of reflectivity. For evaluating temperature-moisture reliability, after they were left at 70° C. and at a humidity of 90% for 24 hours, changes in C/N ratio were detected.

Results of the tests are given as shown in the following Table 1.

COMPARATIVE EXAMPLES 1 AND 2

Optical recording media having the same structure as commercially available CD-ROMs were prepared in a similar manner to that of Example 1, except that the recording layer with a thickness of 0.15 μm was formed using a solution containing only 0.40 g of dye given in the following Table 1 in 10 ml of methylcellosolve and the curing layer 2 between the substrate 1 and the recording layer 3 was not formed.

Various tests were effected as in Example 1.

Results of the tests are given as shown in the following Table 1.

EXAMPLES 4 THROUGH 6

10 g of an epoxy resin (trademark: Eb 264 and Eb 220, commercially available from Sunkyong UCB Corp., Korea, and trademark: M-1310, commercially available from Toa Gosey Chemical Industry Co., Ltd., Japan) was mixed with a photopolymerizing initiator (trademark: Darocure, commercially available from Ciba-Geigy Ltd.) amounting to 1% by weight of the resin. This mixture was coated on an amorphous polyolefin substrate 1 (trademark: Zeonex 280, commercially available from Nippon Zeon Co., Ltd., Japan) having pregrooves, to form a curing layer 2 with a thickness of 0.5 μm. Over the curing layer 2 was coated dye (commercially available from Nippon Kanko Shikiso Kenkyusho K.K., Japan), to form a recording layer 3 with a thickness of 0.15 μm.

Prior to formation of the recording layer 3, the curing layer 3 was exposed to a UV-curing lamp with a power of 1.3 kw for several seconds, to provide the curing layer 2 with some hardness. For the reflective layer 3, Au was deposited in a thickness of 1000 Å. SD-17 (trademark, commercially available from Dainippon Ink & Chemicals Co., Ltd., Japan) was used for a protective layer 4 with a thickness of 10 μm.

To prevent the recording layer from being rewritten after write, the organic optical recording media thus obtained, after being recorded, were completely cured by irradiating with the UV-curing lamp for several tens of minutes. Read characteristics of the recorded media were evaluated by CD-CAT (trademark, commercially available from Studer Revox A.G.).

The media were tested for light stability and temperature-moisture reliability in a similar manner to that of Example 1.

Results of the tests are given as shown in the following Table 2.

TABLE 1

| Substance & Test Results | Example Nos. | | | | |
|---|---|---|---|---|---|
| | 1 | 2 | 3 | C-1 | C-2 |
| Dye | NK-3219 | NK-3219 | NK-1836 | NK-3219 | NK-1836 |
| EOCN1020/PSM4261/TPP | 10/4/0.1 | 10/5/0/1 | 10/4/0.1 | — | — |
| C/N Ratio (dB) | 54 | 59 | 51 | 53 | 54 |
| *[1]C/N Ratio After Reliability Test | 50 | 53 | 50 | 25 | 27 |
| *[2]Reflectivity | 74 | 73 | 70 | 71 | 69 |
| *[3]Reflectivity After Light-Stability Test | 72 | 71 | 70 | 80 | 83 |
| *[4]C/N Ratio (dB) After $10^5$ Times Read | 53 | 56 | 51 | 50 | 50 |

TABLE 1-continued

| Substance & | Example Nos. | | | | |
|---|---|---|---|---|---|
| Test Results | 1 | 2 | 3 | C-1 | C-2 |
| C/N Ratio After Light-Stability Test | 49 | 52 | 50 | 25 | 27 |

*[1]C/N ratio after left at 70° C. and at a humidity of 90%, for 24 hrs.
*[2]Reflectivity of unrecorded face.
*[3]Exposed to a light of Xe lamp with a power of 1.5 kw, 15 cm distant from object, for 20 hrs.
*[4]C/N ratio after repetitively reading.

TABLE 2

| Substance & | Example Nos. | | |
|---|---|---|---|
| Test Results | 4 | 5 | 6 |
| Dye | NK-3219 | NK-3219 | NK-3219 |
| UV curing Resin | Eb 264 | Eb 220 | M-1310 |
| C/N Ratio (dB) | 53 | 57 | 51 |
| *[1]C/N Ratio After Reliability Test | 50 | 56 | 51 |
| *[2]Reflectivity | 72 | 71 | 71 |
| *[3]Reflectivity After Light-Stability Test | 49 | 52 | 50 |
| *[4]C/N Ratio (dB) After $10^5$ Times Read | 51 | 56 | 50 |

*[1]C/N ratio after left at 70° C. and at a humidity of 90%, for 24 hrs.
*[2]reflectivity of unrecorded face.
*[3]exposed to a light of Xe lamp with a power of 1.5 kw, 15 cm distant from object, for 20 hrs.
*[4]C/N ratio after repetitively reading.

As is apparent from the tables, the organic optical recording media according to the present invention exhibit stable (not lowered) read characteristics after being read $10^5$ times. In addition, the organic optical recording media of the present invention function to lock the recording by curing the resin of the recording layer, so that, once recorded, rewrite or additional recording is not allowed therein. Further, the present organic optical recording media also have stable read characteristics of at least 45 dB even after being irradiated with a light with a short wavelength, as compared to not more than 30 dB of conventional recording media which employ a recording layer consisting only of dye.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A Write Once Read Many organic optical recording medium comprising a substrate, a recording layer, a reflective layer and a protective layer, characterized in that the recording layer consists of near infrared absorbing dye capable of absorbing a laser beam and of generating heat, so as to locally deform the recording layer and further on or under the recording layer a low molecular weight unreacted curing layer is provided consisting of a thermosetting or photocuring resin which is crosslinked after recording to remove recording capacity of the recording layer.

2. A Write Once Read Many type organic optical recording medium, according to claim 1, wherein said near infrared absorbing dye of said recording layer is at least one dye selected from the group consisting of cyanines, quinones, pthalocyanines and chroconiums.

3. A Write Once Read Many type organic optical recording medium, according to claim 2, wherein said cyanine type dye is represented by the following formula I:

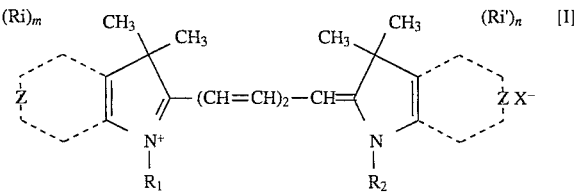

wherein Z is a group to form a benzene ring or naphthalene ring;

$R_1$ and $R_2$ are each independently selected from the group consisting of alkyl, alkoxy, hydroxy, carbonyl, allyl and alkyl halide;

Ri and Ri' may be the same with or different from each other with each being one substituent selected from the group consisting of a hydrogen atom, a halogen atom, an alkyl group containing 2 to 5 carbon atoms and an alkoxy group containing 2 to 5 carbon atoms;

m and n are integers of 1 to 4, representing the number of substituent(s); and $X^-$ is an anion of a halogen atom, perchloric acid, alkyl sulfonic acid, or toluene sulfonic acid.

4. A Write Once Read Many type organic optical recording medium, according to claim 1, wherein said curing layer is approximately 0.1 to approximately 0.5 μm thick.

5. A Write Once Read Many type organic optical recording medium, according to claim 1, wherein said medium is a disk type in which said curing layer, said recording layer, said reflective layer and said protective layer are formed in sequence over said substrate.

6. A Write Once Read Many type organic optical recording medium, according to claim 1, wherein said medium is a tape in which said reflective layer, said recording layer, said curing layer and said protective layer are formed in sequence over said substrate.

7. A method for the prevention of rewrite in a Write Once Read Many organic optical recording medium comprising a substrate, a low molecular weight unreacted curing layer, a recording layer having information written therein, a reflective layer and a protective layer, comprising curing the curing layer by heating up to 50° C. or irradiating with a ultraviolet light after writing, thereby removing recording capacitance of the recording layer, said recording layer consisting of a dye able to absorb near-infrared rays and thus to generate heat and having said curing layer consisting of a thermosetting or photocuring resin thereon or thereunder.

* * * * *

UNITED STATES PATENT AND TRADEMARK OFFICE
CERTIFICATE OF CORRECTION

PATENT NO. : 5,503,957
DATED : April 2, 1996
INVENTOR(S) : Jung H. Kim, et al

It is certified that error appears in the above-indentified patent and that said Letters Patent is hereby corrected as shown below:

Column 3: Line 18: "21-32656" should read --2-132656--.

Column 5: Lines 5&6: "curing layer 1," should read --curing layer 2,--; Lines 13&14 "but transformed." should read --but transformed--.

Column 10: Line 16: "said cyanine type dye" should read --said cyanine dye--; Line 46: "a disk type in which" should read --a disk in which--.

Signed and Sealed this

Thirteenth Day of August, 1996

*Attest:*

BRUCE LEHMAN

*Attesting Officer*  *Commissioner of Patents and Trademarks*